April 30, 1940.  C. H. HART  2,198,814
CARCASS OPENER
Filed April 12, 1938
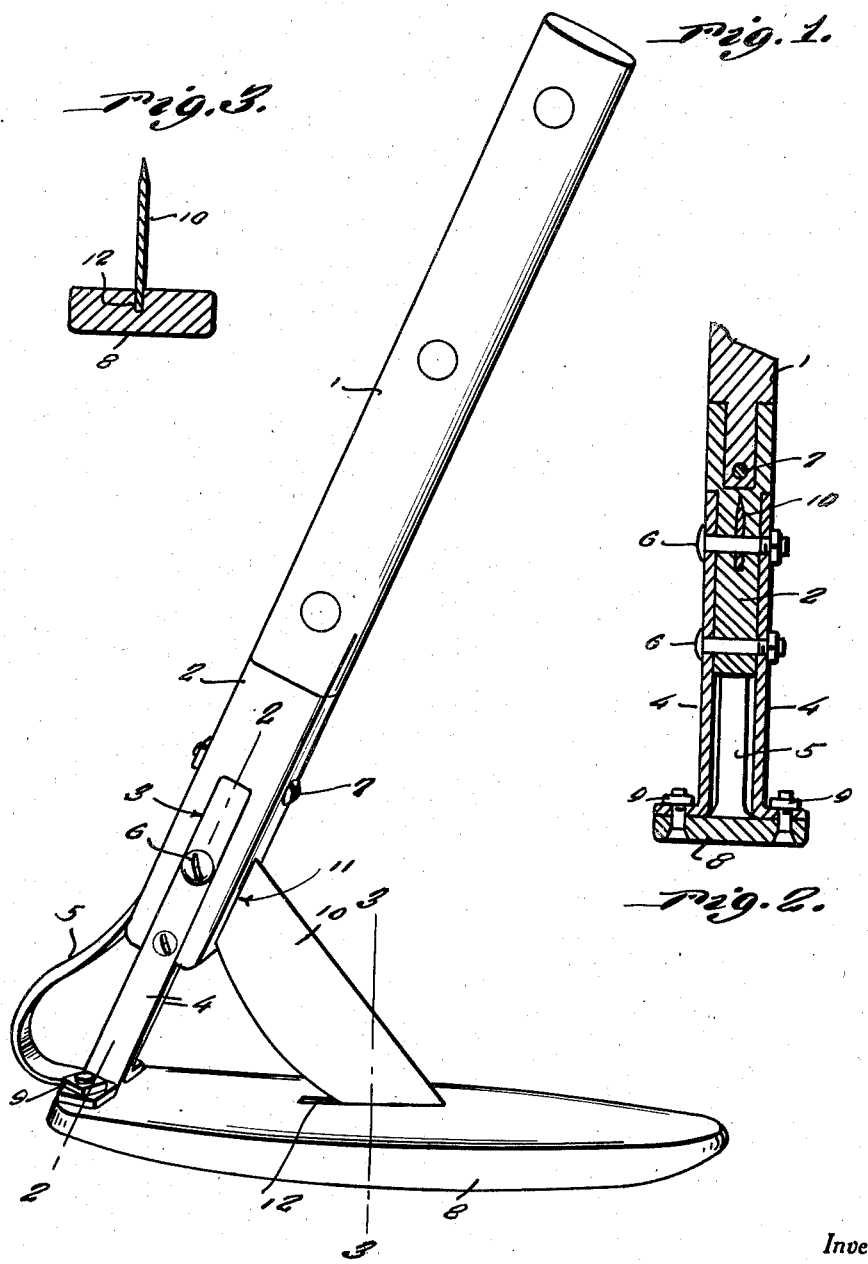
Inventor
C. H. Hart
By Clarence A. O'Brien
and Hyman Berman
*Attorneys*

Patented Apr. 30, 1940

2,198,814

UNITED STATES PATENT OFFICE 2,198,814

CARCASS OPENER

Charles H. Hart, Lancaster, Ohio

Application April 12, 1938, Serial No. 201,640

1 Claim. (Cl. 30—286)

This invention relates to a tool for opening the carcasses of hogs, beeves, etc., the general object of the invention being to provide a device whereby the carcass of an animal can be opened readily without danger of cutting the entrails.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a perspective view of the device.
Figure 2 is a section on line 2—2 of Figure 1.
Figure 3 is a section on line 3—3 of Figure 1.

In this drawing, the numeral 1 indicates the elongated handle of the device, which has a metal part 2 at its inner end, which is formed with the side grooves 3 and a groove in its rear edge. Side bars 4 have portions fitting in the grooves 3 and a top bar 5 has a substantially straight part fitting in the rear groove, the side bars being held in place by the bolts 6 passing through the part 2, and the bar 5 being held in place by a bolt 7 passing through said bar 2. The numeral 8 indicates an elongated shield-forming member which is of the shape shown, and one end of this member is bolted to the bars 4 and 5, as shown at 9, this member 8 extending at an acute angle from the handle. A diagonally arranged knife 10 passes into a slit 11 formed in the member 2 and said end of the knife is held in place by one of the bolts 6, as shown in Figure 2. The other end of the knife fits in a slot 12 formed in the member 8.

In using this device, the shield member 8 is placed in the opening made in the carcass at the rectum until the knife engages the carcass and then the device is drawn along the carcass to the breast bone, so that the knife will open the carcass and the shield 8 obviate cutting of the entrails or the hands of the operator. By removing the upper bolt 6, the knife can be removed for sharpening or repair purposes, or for the substitution of a new knife.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A carcass opener comprising an elongated shield adapted to be forced endwise through the carcass and having leading and trailing ends, respectively, a handle bar fixed at one end to the trailing end of the shield to extend therefrom in angular forwardly inclined relation to the shield for pulling the latter through the carcass, and an elongated cutting blade fixed at one end to said handle bar and having its other end anchored in said shield centrally thereof to cut between said handle bar and shield, said blade having a leading cutting edge inclining rearwardly of the shield to said handle bar at an obtuse angle thereto whereby under endwise movement of the shield through the carcass said blade will effect a draw cut outwardly of the shield and carcass.

CHARLES H. HART.